United States Patent
Tsuchihashi

(10) Patent No.: US 7,962,024 B2
(45) Date of Patent: Jun. 14, 2011

(54) BLUR CORRECTING DEVICE, BLUR CORRECTING METHOD, AND IMAGE PICKUP APPARATUS

(75) Inventor: Kousuke Tsuchihashi, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 12/590,894

(22) Filed: Nov. 16, 2009

(65) Prior Publication Data

US 2010/0150537 A1 Jun. 17, 2010

(30) Foreign Application Priority Data

Dec. 11, 2008 (JP) ................ P2008-315428

(51) Int. Cl.
*G03B 17/00* (2006.01)
(52) U.S. Cl. ........................................ 396/55
(58) Field of Classification Search ............. 396/55
See application file for complete search history.

(56) References Cited

U.S. PATENT DOCUMENTS

| | | | |
|---|---|---|---|
| 4,970,540 A * | 11/1990 | Vasey et al. | 396/55 |
| 5,845,156 A | 12/1998 | Onuki | |
| 6,097,896 A | 8/2000 | Usui | |
| 6,332,060 B1 * | 12/2001 | Miyamoto et al. | 396/55 |
| 6,940,542 B2 * | 9/2005 | Kitazawa et al. | 348/208.99 |
| 7,319,815 B2 * | 1/2008 | Seo | 396/55 |
| 7,542,088 B2 | 6/2009 | Takemoto et al. | |
| 2004/0052513 A1 | 3/2004 | Ohkawara et al. | |

FOREIGN PATENT DOCUMENTS

| | | |
|---|---|---|
| EP | 1647859 A1 | 4/2006 |
| JP | 05-066450 A | 3/1993 |
| JP | 10-079883 A | 3/1998 |
| JP | 10-108062 A | 4/1998 |
| JP | 10-153809 A | 6/1998 |
| JP | 11-352536 A | 12/1999 |
| JP | 2002-156675 A | 5/2002 |
| JP | 2005-258277 A | 9/2005 |
| JP | 2005-303933 A | 10/2005 |
| JP | 2008-275826 A | 11/2008 |

OTHER PUBLICATIONS

European Search Report, EP 09178766, dated Apr. 9, 2010.

* cited by examiner

*Primary Examiner* — Rodney E Fuller
(74) *Attorney, Agent, or Firm* — Lerner, David, Littenberg, Krumholz & Mentlik, LLP

(57) ABSTRACT

A blur correcting device includes a shake detecting unit configured to detect a shake and output a detection signal indicating a result of the detection; a drive unit configured to displace a relative positional relationship between a lens unit and an image pickup element relative to an optical axis such that a position of an optical image formed on an image pickup surface of the image pickup element is displaced on the image pickup surface; and a control unit configured to increase a displacement range when the amount of shake indicated by the detection signal is larger than a predetermined level, displace the relative positional relationship between the lens unit and the image pickup element within the increased displacement range in accordance with the detection signal, and thereby correct a blur of the optical image on the image pickup surface caused by the shake detected by the shake detecting unit.

7 Claims, 9 Drawing Sheets

BLUR CORRECTING DEVICE, BLUR CORRECTING METHOD, AND IMAGE PICKUP APPARATUS

CROSS-REFERENCE TO RELATED APPLICATION

The present application claims priority from Japanese Patent Application No. JP 2008-315428 filed in the Japanese Patent Office on Dec. 11, 2008, the entire content of which is incorporated herein by reference.

BACKGROUND OF THE INVENTION

1. Field of the Invention

The present invention relates to blur correcting devices, blur correcting methods, and image pickup apparatuses. In particular, the present invention relates to techniques which make it possible to obtain a blur-corrected image even when an image pickup apparatus shakes considerably.

2. Description of the Related Art

In the related art, to prevent the position of an optical image on an image pickup surface from being moved by a shake, a blur correcting mechanism of an image pickup apparatus has, for example, a correction lens for correcting an optical axis.

In this blur correcting mechanism, an angle by which the optical axis can be corrected by the correction lens is larger in the case where the zoom position is at the wide end than that in the case where the zoom position is at the tele end. Also, when the amount of correction made by the correction lens at the wide end is the same as that at the tele end, the angle of correction made by the correction lens at the wide end is larger than that at the tele end. As described in Japanese Unexamined Patent Application Publication No. 5-66450 (corresponding to U.S. Pat. No. 5,845,156A), the fact that the angle of correction is larger at the wide end means that an aberration in an image pickup optical system is larger at the wide end. Japanese Unexamined Patent Application Publication No. 5-66450 discloses a technique in which a displacement range of a correction lens is limited in accordance with a focal length. This prevents blur correction from being performed under the condition of large optical aberration, and improves performance of a panning operation.

SUMMARY OF THE INVENTION

When a displacement range of a correction lens is limited in accordance with a focal length so as to prevent blur correction from being performed under the condition of large optical aberration, if, for example, an image pickup apparatus considerably shakes while an image pickup operation is being performed at the wide end where a large optical aberration occurs, since the displacement of the correction lens is limited, it is difficult to properly perform blur correction. This means that when the zoom position is at the wide end, if, for example, the user performs an image pickup operation while walking, blur correction is not performed when the image pickup apparatus shakes considerably. As a result, it is difficult to obtain an excellent blur-free picked-up image.

Accordingly, it is desirable to provide a blur correcting device, a blur correcting method, and an image pickup apparatus that make it possible to perform blur correction in which both reduction in degradation of a picked-up image and improvement in blur correction performance can be achieved.

A blur correcting device according to an embodiment of the present invention includes a shake detecting unit configured to detect a shake and output a detection signal indicating a result of the detection; a drive unit configured to displace a relative positional relationship between a lens unit and an image pickup element relative to an optical axis such that a position of an optical image formed on an image pickup surface of the image pickup element is displaced on the image pickup surface; and a control unit configured to increase a displacement range when the amount of shake indicated by the detection signal is larger than a predetermined level, displace the relative positional relationship between the lens unit and the image pickup element within the increased displacement range in accordance with the detection signal, and thereby correct a blur of the optical image on the image pickup surface caused by the shake detected by the shake detecting unit.

The displacement range of the lens unit or the image pickup element may be limited in advance to a range narrower than a maximum displacement range in accordance with a zoom position. Then, the relative positional relationship between the lens unit and the image pickup element may be displaced in this displacement range in accordance with the detection signal. For example, the lens unit may be displaced relative to the image pickup element or the optical axis, so that the position of an optical image formed on the image pickup surface of the image pickup element is moved on the image pickup surface. Thus, a blur of the optical image formed on the image pickup surface is corrected in a manner in which priority is given to image quality. When the amount of shake detected by the shake detecting unit is larger than the predetermined level, the limit placed on the displacement range may be removed to increase the displacement range. By displacing the relative positional relationship between the lens unit and the image pickup element within the increased displacement range in accordance with the detection signal, a blur of the optical image formed on the image pickup surface is corrected in a manner in which priority is given to blur correction performance. On the basis of the detection signal generated by the shake detecting unit, a determination may be made as to whether a panning operation or a tilting operation is being performed. When it is determined that no panning or tilting operation is being performed, the displacement range of the lens unit may be increased. It may be possible to select any of the following operation modes, that is, an operation mode in which the displacement range is increased to perform correction of a blur of the optical image when the shake detected by the shake detecting unit is larger than the predetermined level, an operation mode in which correction of a blur of the optical image is not performed, and an operation mode in which the displacement range is fixed to perform correction of a blur of the optical image regardless of the shake detected by the shake detecting unit.

A blur correcting method according to another embodiment of the present invention includes the steps of detecting a shake and outputting a detection signal indicating a result of the detection; displacing a relative positional relationship between a lens unit and an image pickup element relative to an optical axis such that a position of an optical image formed on an image pickup surface of the image pickup element is displaced on the image pickup surface; and increasing a displacement range when the amount of shake indicated by the detection signal is larger than a predetermined level, displacing the relative positional relationship between the lens unit and the image pickup element within the increased displacement range in accordance with the detection signal, and thereby correcting a blur of the optical image on the image pickup surface caused by the detected shake.

An image pickup apparatus according to another embodiment of the present invention includes a shake detecting unit configured to detect a shake and output a detection signal indicating a result of the detection; a drive unit configured to displace a relative positional relationship between a lens unit and an image pickup element relative to an optical axis such that a position of an optical image formed on an image pickup surface of the image pickup element is displaced on the image pickup surface; a signal processing unit configured to perform camera signal processing using an image signal generated by the image pickup element; and a control unit configured to increase a displacement range when the amount of shake indicated by the detection signal is larger than a predetermined level, displace the relative positional relationship between the lens unit and the image pickup element within the increased displacement range in accordance with the detection signal, and thereby correct a blur of the optical image on the image pickup surface caused by the shake detected by the shake detecting unit.

According to the embodiments of the present invention, the displacement range of the lens unit or the image pickup element is changed in accordance with a shake detected by the shake detecting unit, so that the displacement range is widened when the amount of the detected shake is large. When the amount of the detected shake is small, the displacement range is narrowed, so that blur correction which does not significantly degrade an image is performed. On the other hand, when the amount of the detected shake is large, the displacement range is widened, so that high-performance blur correction is performed. Thus, it is possible to perform blur correction in which both reduction in image degradation and improvement in blur correction performance can be achieved.

DESCRIPTION OF THE PREFERRED EMBODIMENTS

Figure 1:
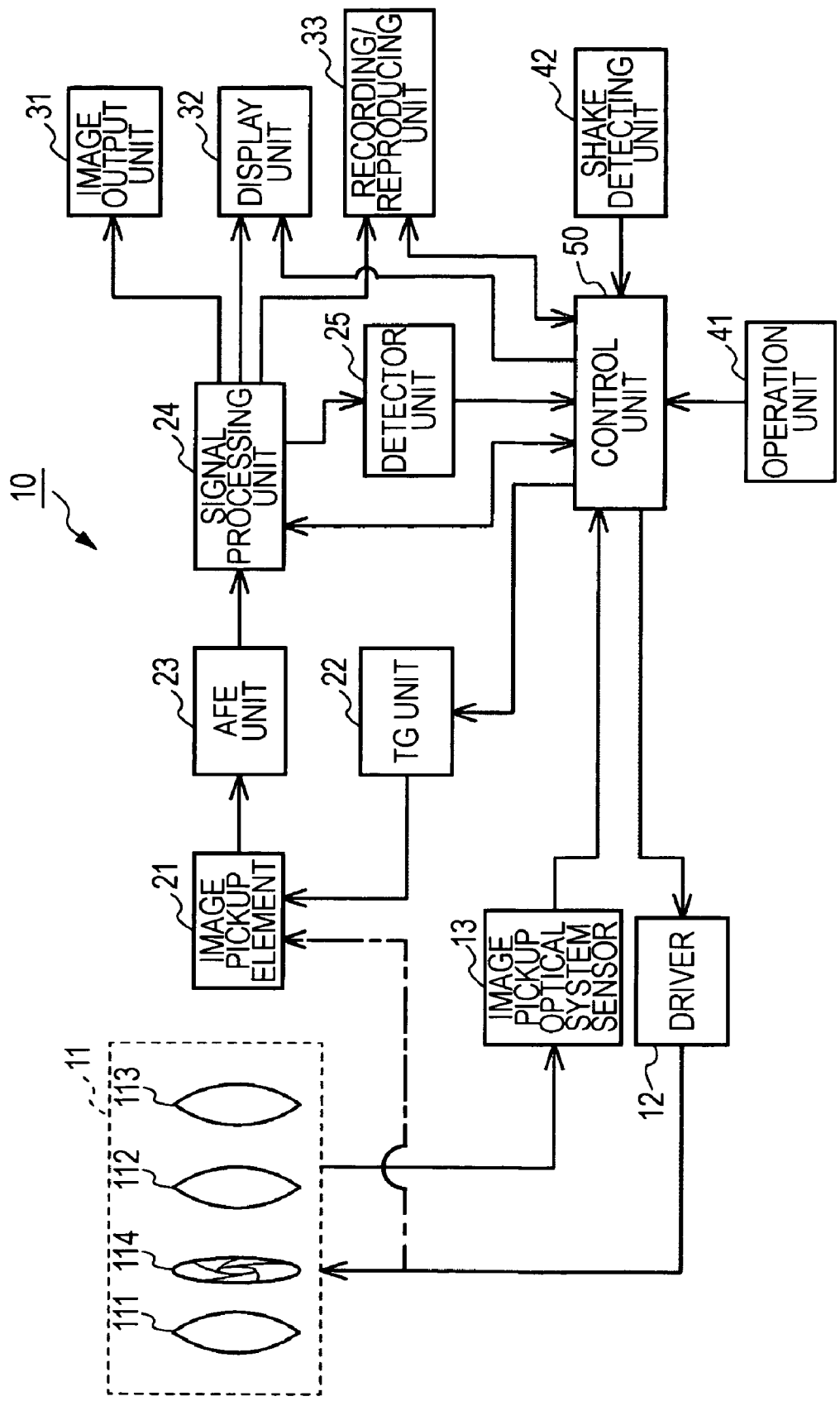
FIG. 1 illustrates a configuration of an image pickup apparatus including a blur correcting device.

Hereinafter, embodiments for carrying out the present invention will be described in the following order:
1. Configuration of image pickup apparatus
2. Operation of blur correcting device
3. First operation of blur correcting device
4. Second operation of blur correcting device
5. Another operation for determining limiting condition (1. Configuration of Image Pickup Apparatus)

FIG. 1 is a block diagram illustrating a configuration of an image pickup apparatus including a blur correcting device according to an embodiment of the present invention. An image pickup apparatus 10 includes an image pickup optical system block 11, a driver 12, an image pickup optical system sensor 13, an image pickup element 21, a timing signal generating (TG) unit 22, an analog front-end (AFE) unit 23, a signal processing unit 24, and a detector unit 25. The image pickup apparatus 10 further includes an image output unit 31, a display unit 32, a recording/reproducing unit 33, an operation unit 41, a shake detecting unit 42, and a control unit 50.

The image pickup optical system block 11 includes a zoom lens 111 that performs zooming; a focus lens 112 that performs focusing; a correction lens unit 113 that moves, on an image pickup surface of the image pickup element 21, the position of an optical image formed on the image pickup surface; and an aperture mechanism 114 that adjusts the amount of light.

The correction lens unit 113 includes, for example, a correction lens and an actuator. The correction lens is arranged such that its optical axis coincides with that of an image pickup optical system. The actuator displaces the correction lens in a direction orthogonal to the optical axis of the image pickup optical system. With this configuration, the correction lens unit 113 displaces the correction lens in a direction orthogonal to the optical axis of the image pickup optical system such that the position of an optical image formed on the image pickup surface is moved on the image pickup surface.

A variangle prism unit may be used as the correction lens unit 113. The variangle prism unit is composed of an incoming end plate and an outgoing end plate, which are translucent and disposed on end faces of a flexible tube, such as bellows. The tube is filled with translucent liquid having a desired refractive index. When the variangle prism unit is used, one of the incoming end plate and the outgoing end plate is secured at a fixed position, while the other is driven by the actuator to form an optical wedge. With this configuration, the correction lens unit 113 displaces, for example, the angle of inclination of the outgoing end plate relative to the incoming end plate such that the position of an optical image formed on the image pickup surface is moved on the image pickup surface.

The driver 12 drives the zoom lens 111, the focus lens 112, and the actuator of the correction lens unit 113 on the basis of a lens control signal from the control unit 50. Additionally, the driver 12 drives the aperture mechanism 114 on the basis of an aperture control signal from the control unit 50.

The image pickup optical system sensor 13 detects lens positions of the zoom lens 111, the focus lens 112, and the correction lens unit 113, and a set position of the aperture mechanism 114. Then, the image pickup optical system sensor 13 supplies positional signals corresponding to the detected positions to the control unit 50.

The image pickup element 21 may be, for example, a charge-coupled device (CCD) sensor or a complementary metal oxide semiconductor (CMOS) image sensor. The image pickup element 21 converts a subject image formed on the image pickup surface by the image pickup optical system block 11 to an electric signal and outputs the electric signal to the AFE unit 23.

The TG unit 22 generates various drive pulses necessary for the image pickup element 21 to output an electric signal representing a picked-up image, and electronic shutter pulses for controlling the charge accumulation time of the image pickup element 21.

The AFE unit 23 performs, on an electric signal (image signal) output from the image pickup element 21, noise reduction processing, such as correlated double sampling (CDS), and automatic gain control (AGC) for adjusting the signal level of an image pickup signal to a desired level. Additionally, the AFE unit 23 converts the noise-reduced, gain-controlled analog image pickup signal to a digital signal and outputs the digital signal to the signal processing unit 24.

The signal processing unit 24 performs camera signal preprocessing, camera signal processing, resolution conversion processing, and compression/decompression processing. In the camera signal preprocessing, an image signal supplied from the AFE unit 23 is subjected to defect correction for correcting a signal of a defective pixel in the image pickup element 21, and shading correction for correcting light falloff at the edges of lenses. The camera signal processing involves white balance adjustment and brightness correction. For a digital camera, a color filter array may be provided in front of the image pickup element 21, so that red, green, and blue signals can be obtained from the single image pickup element 21. In such a case, the camera signal processing involves demosaic processing, in which a signal of a missing color component in each pixel is generated by interpolation, which uses signals of neighboring pixels. In the resolution conversion processing, an image signal subjected to the camera signal processing or a decompression-decoded image signal is converted to an image signal of predetermined resolution. In the compression/decompression processing, an image signal subjected to the camera signal processing or a resolution-converted image signal is compression-encoded, so that, for example, a JPEG encoded signal is generated. The compression/decompression processing also involves decompression-decoding of a JPEG encoded signal. In the compression/decompression processing, an image signal of a still image may be compression-encoded by a method other than the JPEG method. Also, in the compression/decompression processing, an image signal of a moving image may be compression-encoded by a moving image compression method.

The detector unit 25 uses an image pickup signal supplied to the signal processing unit 24 to detect the level of brightness and the focus state of a picked-up image, generates a detector signal indicating the level of brightness and the focus state, and supplies the detector signal to the control unit 50.

The image output unit 31 converts an image signal processed by the signal processing unit 24 to an image signal having a format appropriate to an external device connected to the image pickup apparatus 10.

The display unit 32 displays an image picked up by the image pickup apparatus 10 and a picked-up image reproduced by the recording/reproducing unit 33. The display unit 32 also displays menus for making settings for the image pickup apparatus 10.

A recording medium, such as a flash memory, an optical disk, or a magnetic tape is used in the recording/reproducing unit 33. The recording/reproducing unit records, in the recording medium, an image signal or an encoded signal of a picked-up image output from the signal processing unit 24. The recording/reproducing unit 33 reads an image signal recorded in the recording medium and supplies the image signal to the image output unit 31 and the display unit 32. The recording/reproducing unit 33 also reads an encoded signal recorded in the recording medium and supplies the encoded signal to the signal processing unit 24. The configuration of the recording/reproducing unit 33 is not limited to a unit into which and from which a recording medium can be inserted and removed. For example, a hard disk device may serve as the recording/reproducing unit 33 in the image pickup apparatus 10.

The operation unit 41 includes operation buttons and a touch panel on a screen of the display unit 32. The operation unit 41 generates an operation signal corresponding to a user's operation and supplies the operation signal to the control unit 50.

The shake detecting unit 42 includes a shake detecting sensor, such as a gyroscope, that detects a shake of the image pickup apparatus 10. The shake detecting sensor includes a yawing angular velocity sensor that detects, for example, an angular velocity in response to a shake in the yawing direction and a pitching angular velocity sensor that detects, for example, an angular velocity in response to a shake in the pitching direction. The levels of detection signals output from the yawing angular velocity sensor and the pitching angular velocity sensor are equal to, for example, a reference value VL0 when no angular velocity is given. When the image pickup apparatus 10 rotates in one direction (normal direction), the signal level of the detection signal becomes higher than the reference value VL0 depending on the angular velocity. When the image pickup apparatus 10 rotates in the other direction (reverse direction), the signal level of the detection signal becomes lower than the reference value VL0 depending on the angular velocity.

The shake detecting unit 42 includes a processing circuit that performs signal processing on the detection signal. For example, the processing circuit filters the detection signal to remove unwanted signal components, such as noise components, frequency components higher than signal components of an angular velocity value, and resonance frequency components. Additionally, the processing circuit corrects a drift that occurs as temperature and time change, converts the detection signal to a digital signal, and supplies the digital signal to the control unit 50. When the shake detecting unit 42 is configured to output the detection signal as an analog signal, the control unit 50 may convert the detection signal to a digital signal and use the digital signal.

The shake detecting unit 42 is not limited to that including an angular velocity sensor. For example, the shake detecting unit 42 may include an acceleration sensor or a G sensor for detecting gravity to perform shake detection. When an acceleration sensor is used, the output of the acceleration sensor is integrated to determine the velocity. Then, since the distance of movement can be determined by integrating the velocity, the amount of shake can be determined on the basis of the output of the acceleration sensor.

The control unit 50 includes a central processing unit (CPU) and a memory, which stores various data and programs executed by the CPU. The memory is a nonvolatile memory, such as an electronically erasable and programmable read-only memory (EEPROM) or a flash memory. The CPU in the control unit 50 executes a program stored in the memory to control each part of the image pickup apparatus 10, on the basis of various data stored in the memory and an operation signal supplied from the operation unit 41, such that the image pickup apparatus 10 operates in accordance with a user's operation. For example, when the user performs a shutter operation, the control unit 50 controls the operation of the TG unit 22 to record an encoded signal of a still image picked up at a desired shutter speed in the recording medium of the recording/reproducing unit 33. When the user performs an operation to start recording a moving image, the control unit controls the operation of the TG unit 22 to record an encoded signal of a moving image in the recording medium of the recording/reproducing unit 33.

On the basis of the positional signals supplied from the image pickup optical system sensor 13 and the detector signal supplied from the detector unit 25, the control unit 50 generates a lens control signal and an aperture control signal and supplies these signals to the driver 12. Thus, the driver drives the focus lens 112 and the aperture mechanism 114 such that an in-focus picked-up image having a desired brightness can be obtained. When the user performs a zoom operation, the control unit 50 generates a lens control signal and supplies the lens control signal to the driver 12. Thus, the driver 12 drives the zoom lens 111 such that a picked-up image having a desired zoom ratio can be obtained.

In the image pickup apparatus 10 configured as described above, the blur correcting device includes the image pickup optical system block 11, the driver 12, the image pickup optical system sensor 13, the shake detecting unit 42, and the control unit 50. On the basis of the detection signal supplied from the shake detecting unit 42 and the positional signals supplied from the image pickup optical system sensor 13, the control unit 50 generates a lens control signal and supplies the lens control signal to the driver 12. The lens control signal is for driving the correction lens unit 113 such that a picked-up image can be prevented from blurring. On the basis of the lens control signal, the driver 12 drives the correction lens unit 113 of the image pickup optical system block 11. Thus, by driving the correction lens unit 113 on the basis of the detection signal from the shake detecting unit 42, a relative positional relationship between the correction lens unit 113 and the image pickup element 21 is displaced relative to the optical axis. This moves the position of an optical image formed on the image pickup surface of the image pickup element 21, and allows blur correction to be made. Instead of driving the correction lens unit 113 to make blur correction, the blur correcting device may drive the image pickup element 21 on the basis of the detection signal, as indicated by an alternate long and short dashed line in FIG. 1. Thus, the relative positional relationship between the correction lens unit 113 and the image pickup element 21 is displaced relative to the optical axis, and blur correction can be made. The following describes an example in which by moving the correction lens unit 113, the relative positional relationship between the correction lens unit 113 and the image pickup element 21 is displaced relative to the optical axis, so that blur correction is made.

(2. Operation of Blur Correcting Device)

An operation of the blur correcting device will now be described. The image pickup optical system having a blur correcting function displaces the correction lens unit 113 in accordance with the detection signal indicating the amount of shake of the image pickup apparatus 10. Thus, a blur of an optical image on the image pickup surface caused by the shake of the image pickup apparatus 10 is corrected. For the blur correcting device, it is desirable that no aberration occur in the entire zoom area even when the correction lens unit 113 is displaced until a maximum displacement range is reached. However, due to various limitations, aberration may not necessarily be able to be completely corrected. Since the necessity of blur correction is more important at the tele end than at the wide end, the image pickup optical system is typically designed to reduce aberration at the tele end. This causes significant aberration to occur at the wide end during blur correction.

Figure 2:
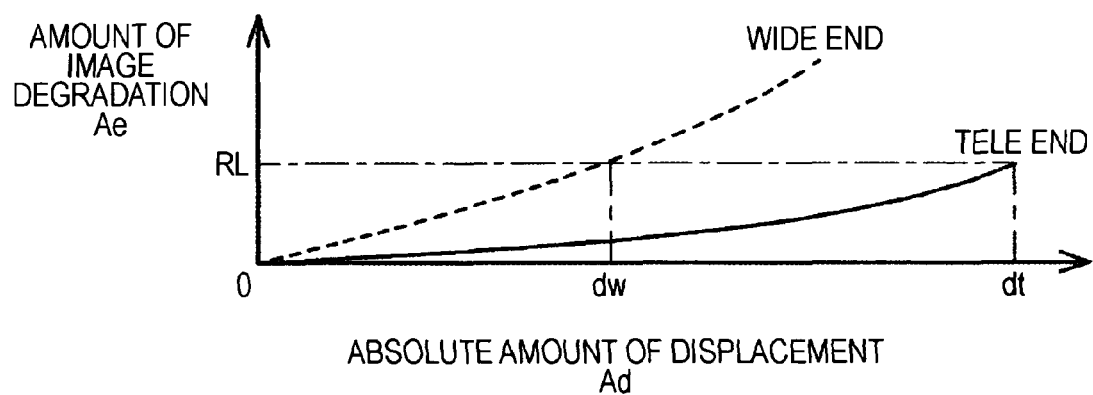
FIG. 2 is a graph showing an example of occurrence of aberration versus the amount of displacement of a correction lens unit.

FIG. 2 is a graph showing an example of occurrence of aberration versus the amount of displacement of the correction lens unit 113. In FIG. 2, the horizontal axis represents the absolute amount of displacement Ad and the vertical axis represents the amount of image degradation Ae corresponding to the amount of aberration.

For example, a relationship between the amount of displacement and the amount of image degradation at the tele end is represented by a solid line, and a relationship between the amount of displacement and the amount of image degradation at the wide end is represented by a broken line. That is, to limit the amount of image degradation Ae to "RL", it is necessary to limit the absolute amount of displacement for the tele end to a displacement range "dt", while it is necessary to limit the absolute amount of displacement for the wide end to a displacement range "dw", which is narrower than "dt" for the tele end.

Figure 3:
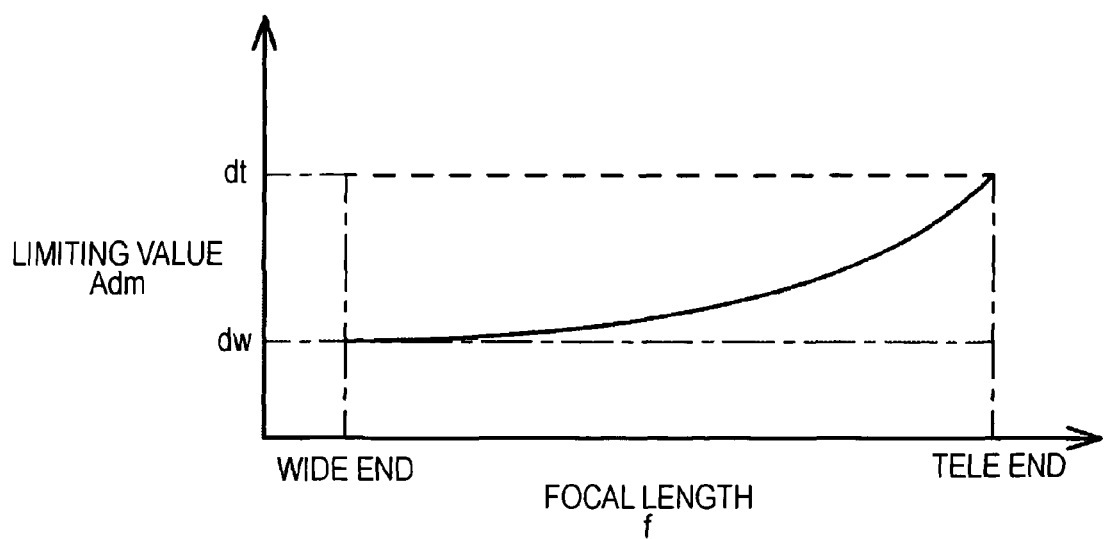
FIG. 3 is a graph showing an exemplary relationship between a focal length and a limiting value of the amount of displacement.

FIG. 3 is a graph showing an exemplary relationship between a focal length f and a limiting value Adm of the amount of displacement in a state where the amount of image degradation Ae is limited to "RL". In FIG. 3, the horizontal axis represents the focal length f and the vertical axis represents the limiting value Adm of the amount of displacement.

As shown in FIG. 3, when the zoom position is at the tele end, the limiting value Adm of the amount of displacement corresponding to the focal length f is "dt". As the focal length decreases toward the wide end, the limiting value Adm of the amount of displacement decreases. When the focal length further decreases and the wide end is reached, the limiting value Adm of the amount of displacement becomes "dw". Therefore, to limit the amount of image degradation Ae to "RL", it is necessary to set a maximum displacement range of the correction lens unit 113 to "dt" and limit the displacement range in accordance with the zoom position, as indicated by a solid line in FIG. 3. When the displacement range is limited, if, for example, the amount of shake is large when the zoom position is at the wide end, it is difficult to perform blur correction because of the limited displacement range. Therefore, when the amount of shake is large, the limit placed on the displacement range is removed, for example, as indicated by a broken line in FIG. 3, so that the displacement range is set to the maximum displacement range. It is thus possible to improve blur correction performance at the wide end and obtain a blur-corrected picked-up image.

(3. First Operation of Blur Correcting Device)

Figure 4:
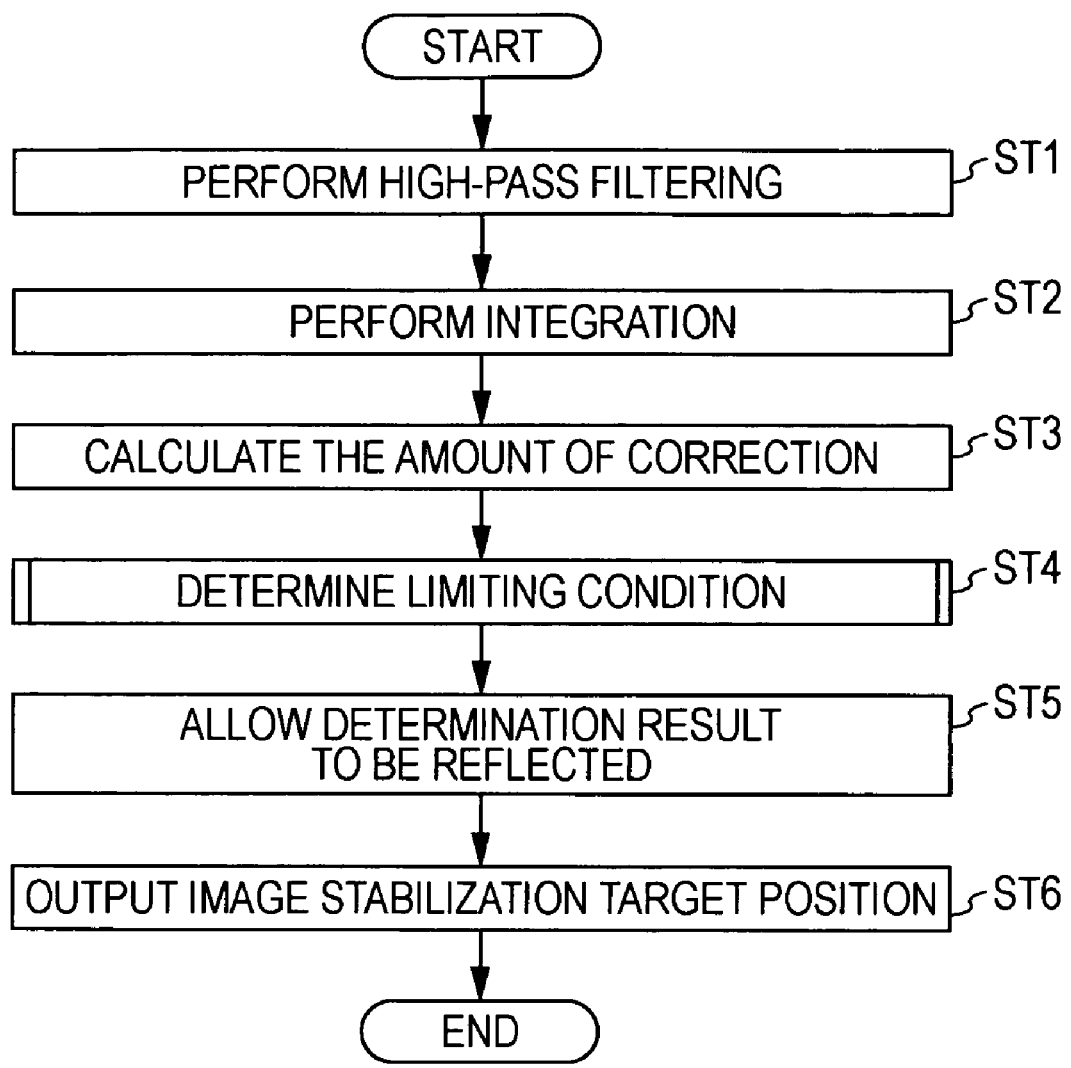
FIG. 4 is a flowchart illustrating a first operation of the blur correcting device.

FIG. 4 is a flowchart illustrating a first operation of the blur correcting device. This operation is based on a configuration in which the shake detecting unit 42 includes an angular velocity sensor, by which a detection signal, which is angular velocity data, is converted to a digital signal and supplied to the control unit 50.

In step ST1, the control unit 50 performs high-pass filtering on the detection signal. This removes direct-current components from the detection signal. Then, the process proceeds to step ST2.

In step ST2, the control unit 50 performs integration on the detection signal. That is, the control unit 50 performs integration on the shake detection signal to convert an angular velocity to an angle. Then, the process proceeds to step ST3.

In step ST3, the control unit 50 calculates the amount of correction. The control unit 50 determines a focal length on the basis of positional signals supplied from the image pickup optical system sensor 13. Additionally, on the basis of the determined focal length and the angle determined in step ST2, the control unit 50 calculates the amount of correction to be made by the correction lens unit 113. Then, the process proceeds to step ST4.

Figure 5:
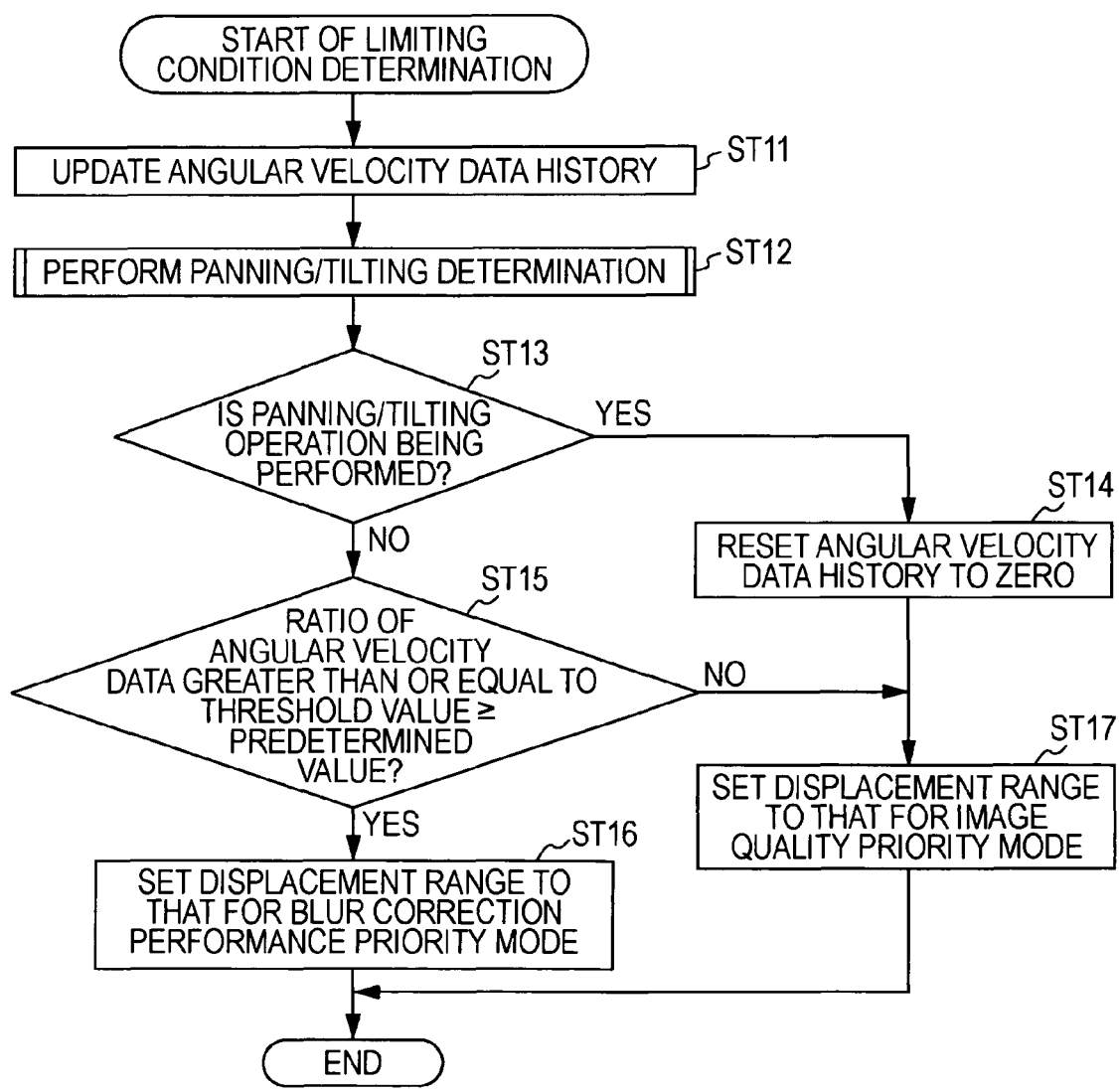
FIG. 5 is a flowchart illustrating a process of determining a limiting condition.

In step ST4, the control unit 50 determines a limiting condition. FIG. 5 is a flowchart illustrating a process of determining a limiting condition. In step ST11, the control unit 50 updates an angular velocity data history for use in the determination. To determine a limiting condition, the control unit 50 stores angular velocity data of a certain period of time as the angular velocity data history. Then, the process proceeds to step ST12.

Figure 6:
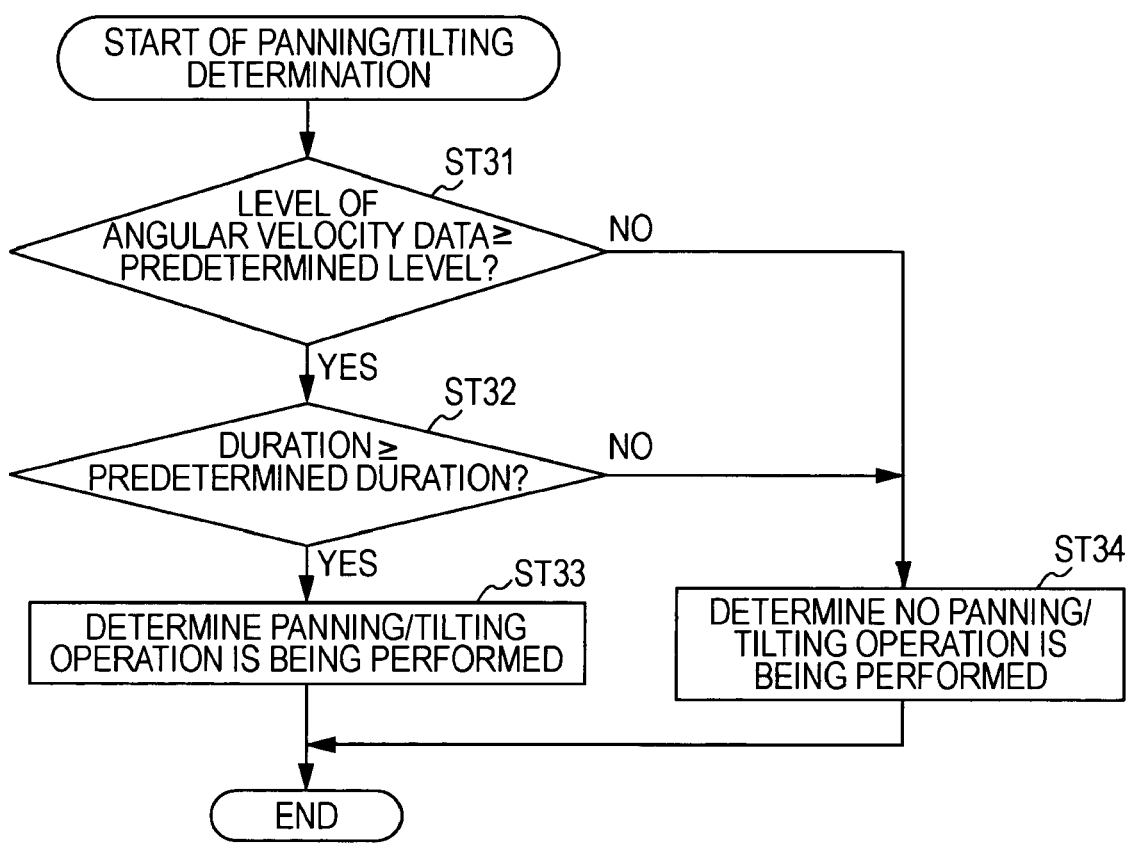
FIG. 6 is a flowchart illustrating a process of panning/tilting determination.

In step ST12, the control unit 50 performs a panning/tilting determination. FIG. 6 is a flowchart illustrating a process of panning/tilting determination. In step ST31, the control unit 50 determines whether the level of angular velocity data is higher than or equal to a predetermined level. If the control unit 50 determines that the level of the angular velocity data is higher than or equal to the predetermined level, the process proceeds to step ST32. If the control unit 50 determines that the level of the angular velocity data is lower than the predetermined level, the process proceeds to step ST34.

In step ST32, the control unit 50 determines whether a duration in which the level of the angular velocity data is higher than or equal to the predetermined level is longer than or equal to a predetermined duration. If the control unit 50 determines that the state in which the level of the angular velocity data is higher than or equal to the predetermined level continues for less than the predetermined duration, the process proceeds to step ST34.

In step ST33, the control unit 50 determines that a panning/tilting operation is being performed, and terminates the process of panning/tilting determination. The control unit 50 determines that a panning operation is being performed when, for example, the image pickup direction is changed rightward or leftward for a predetermined duration or longer at an angular velocity greater than or equal to a predetermined level. The control unit 50 determines that a tilting operation is being performed when, for example, the image pickup direction is changed upward or downward for a predetermined duration or longer at an angular velocity greater than or equal to a predetermined level.

In step ST34, the control unit 50 determines that no panning/tilting operation is being performed, and terminates the process of panning/tilting determination. Since the image pickup direction does not continue to be changed for a predetermined duration or longer at an angular velocity greater than or equal to a predetermined level, the control unit 50 determines that no panning/tilting operation is being performed and terminates the process.

Referring back to FIG. 5, in step ST13, the control unit 50 determines whether a panning/tilting operation is being performed. If the control unit 50 determines, in the process of panning/tilting determination in step ST12, that a panning/tilting operation is being performed, the process proceeds to step ST14. If the control unit 50 determines, in the process of panning/tilting determination in step ST12, that no panning/tilting operation is being performed, the process proceeds to step ST15.

In step ST14, the control unit 50 resets the angular velocity data history described above to zero. Then, the process proceeds to step ST17.

In step ST15, the control unit 50 determines whether the ratio of angular velocity data greater than or equal to a threshold value is greater than or equal to a predetermined value. If the control unit 50 determines that the ratio of angular velocity data greater than or equal to the threshold value is greater than or equal to the predetermined value, the process proceeds to step ST16. If the control unit 50 determines that the ratio of angular velocity data greater than or equal to the threshold value is less than the predetermined value, the process proceeds to step ST17.

In step ST16, the control unit 50 sets the displacement range of the correction lens unit 113 to that for a blur correction performance priority mode. The case where the process proceeds from step ST13 via step ST15 to step ST16 is the case where the amount of shake is large. Therefore, to perform an operation in which priority is given to blur correction performance, the control unit 50 sets the displacement range of the correction lens unit 113 to that, as indicated by the broken line in FIG. 3, obtained by removing a certain limit placed on the displacement range.

In step ST17, the control unit 50 sets the displacement range of the correction lens unit 113 to that for an image quality priority mode. That is, since the amount of shake is small or since a panning/tilting operation is being performed, the control unit 50 determines that it is not necessary to give priority to the blur correction performance. To obtain a high-quality picked-up image suffering less aberration, the control unit 50 performs an operation in which priority is given to image quality. Therefore, the control unit 50 sets the displacement range of the correction lens unit 113 to that limited as indicated by the solid line in FIG. 3.

Referring back to FIG. 4, in step ST5, the control unit 50 allows the result of the determination made in step ST4 to be reflected. If the amount of correction calculated in step ST3 exceeds the displacement range set in the process of determining a limiting condition in step ST4, the control unit 50 limits the amount of correction to the displacement range set in step ST4. If the amount of correction calculated in step ST3 does not exceed the displacement range set in step ST4, the control unit 50 uses the amount of correction without limiting it.

In step ST6, the control unit 50 outputs an image stabilization target position. Specifically, the control unit 50 defines, as the image stabilization target position of the correction lens in the correction lens unit 113, a position reached by moving by the amount of correction determined in step ST5 in a direction in which a blur of an optical image formed on the image pickup surface is to be corrected. Additionally, the control unit 50 generates a lens control signal and outputs the lens control signal to the driver 12, so as to move the correction lens in the correction lens unit 113 to the image stabilization target position. On the basis of the lens control signal supplied from the control unit 50, the driver 12 drives the actuator in the correction lens unit 113 to move the correction lens to the image stabilization target position.

With the processing described above, when the control unit 50 detects that the amount of shake is large, the blur correction performance priority mode is set as the operation mode. As a result, a limit placed on the displacement range is removed and the displacement range is increased. Therefore, for example, when the user performs an image pickup operation while walking when the zoom position is at the wide end, it is possible to realize an image pickup operation in which an image blur is corrected.

When the user performs an image pickup operation while walking, if the zoom position is at the tele end, it is difficult to hold the image pickup apparatus 10 such that a desired subject is consistently located at the center of the screen. Therefore, when the user performs an image pickup operation while walking, the zoom position is typically at the wide end. Then, when the amount of shake is large, if the displacement range of the correction lens unit 113 is changed from that having characteristics represented by the solid line in FIG. 3 to that having characteristics represented by the broken line in FIG. 3, the displacement range is widened at the wide end. Thus, it is possible to perform an image pickup operation in which an image blur is corrected.

To improve the blur correction performance when the zoom position is at the tele end, the displacement range for the tele end may also be widened. For example, as shown in FIG.

Figure 7:
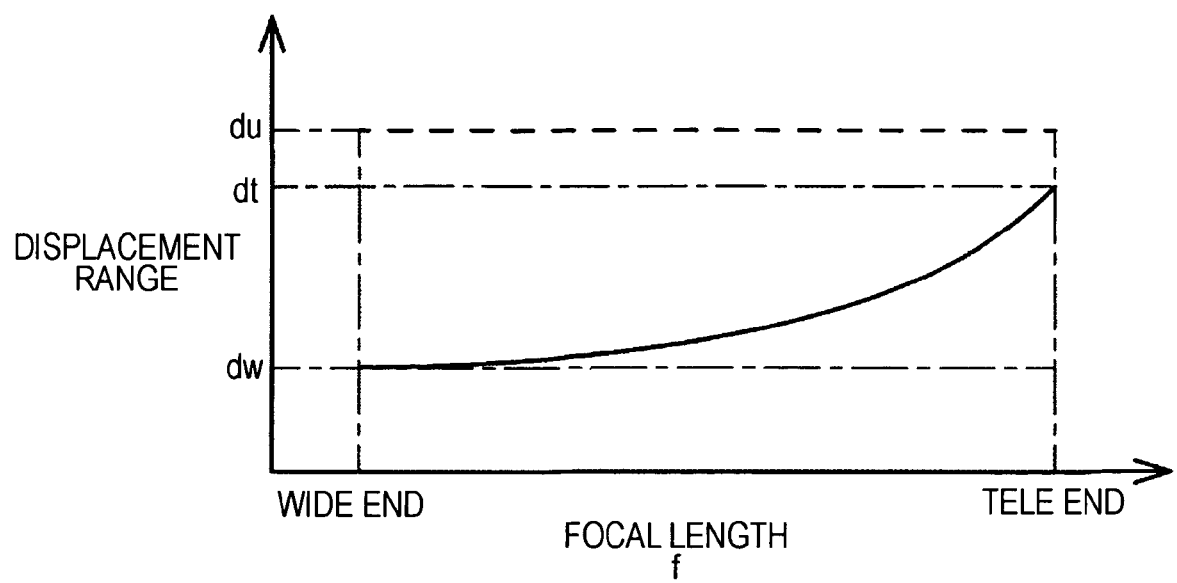
FIG. 7 is a graph showing an exemplary relationship between a focal length and a displacement range.

7, the maximum displacement range may be set to "du", which is wider than "dt", so that the displacement range of the correction lens unit 113 is changed from that indicated by a solid line in FIG. 7 (equivalent to the solid line in FIG. 3) to that indicated by a broken line in FIG. 7.

When the control unit 50 does not detect that the amount of shake is large, the image quality priority mode is set as the operation mode, so that the displacement range is limited in accordance with the zoom position. Therefore, for example, when the user performs an image pickup operation while the zoom position is at the wide end, it is possible to reduce degradation in image quality caused by blur correction. Moreover, when the control unit 50 detects that no panning/tilting operation is being performed and the amount of shake exceeds a predetermined level, the displacement range of the correction lens unit 113 is increased. That is, when a panning operation or a tilting operation is being performed, the displacement range is limited in accordance with the zoom position. Thus, it is possible to prevent the situation where blur correction is performed to correct blur caused by a panning operation or a tilting operation and thus, a subject does not move smoothly in response to a panning operation and a tilting operation.

As described above, since the displacement range of the correction lens unit 113 is changed on the basis of the amount of shake, it is possible to perform an image pickup operation in which both reduction in image degradation and improvement in blur correction performance can be achieved. Additionally, even when a panning operation or a tilting operation is being performed, it is possible to prevent adverse effects caused by blur correction.

Figure 8:
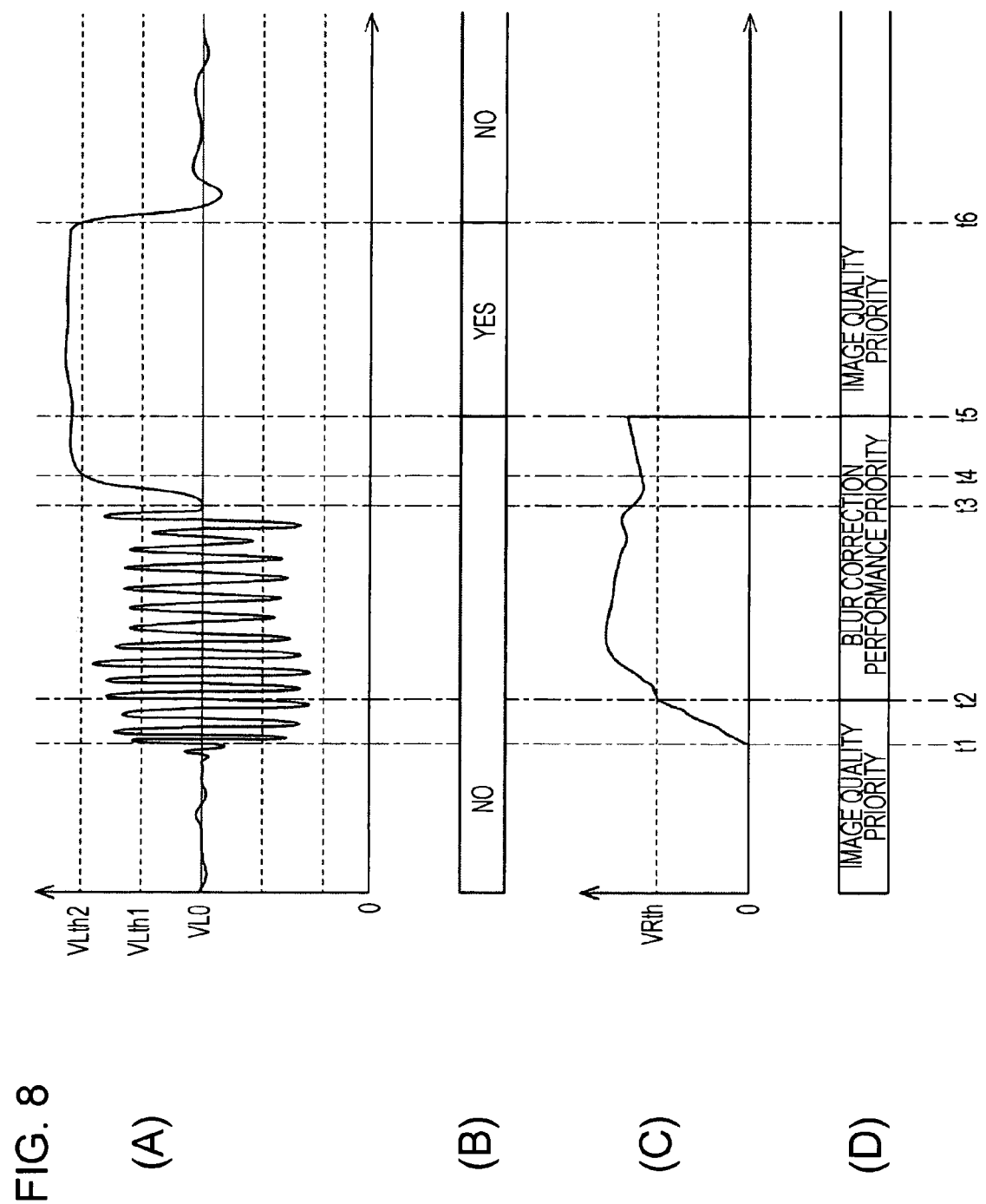
FIG. 8 illustrates an exemplary operation performed by a control unit in accordance with a detection signal obtained from a shake detecting unit.

FIG. 8 illustrates an exemplary operation performed by the control unit 50 in accordance with a detection signal obtained from the shake detecting unit 42.

FIG. 8(A) is a graph showing how the signal level of a detection signal changes with time. In this graph, the signal level of a detection signal obtained when no shake is detected is defined as the reference value "VL0", as described above. A threshold value "VLth1" is a threshold value used to change the displacement range of the correction lens unit 113 to that for the blur correction performance priority mode or to that for the image quality priority mode. A threshold value "VLth2" is a threshold value used to determine whether a panning operation or a tilting operation is being performed.

FIG. 8(B) shows results of a determination as to whether a panning operation or a tilting operation is being performed. Specifically, "YES" indicates that a panning operation or a tilting operation is being performed, while "NO" indicates that no panning or tilting operation is being performed.

FIG. 8(C) is a graph showing the ratio of a detection signal exceeding the threshold value "VLth1". In this graph, a threshold value "VRth" is a threshold value used to change the displacement range of the correction lens unit 113 to that for the blur correction performance priority mode or to that for the image quality priority mode.

FIG. 8(D) shows the displacement range of the correction lens unit 113 and indicates that the displacement range for which of the blur correction performance priority mode and the image quality priority mode is selected.

The control unit 50 starts an operation when, for example, the result of the determination as to whether a panning operation or a tilting operation is being performed is "NO" and the displacement range of the correction lens unit 113 is set to that for the image quality priority mode.

For example, when the user starts walking at time point t1 and the amount of shake of the image pickup apparatus 10 increases, the amount of change of the signal level of the detection signal relative to the reference value "VL0" increases, as shown in FIG. 8(A). When the amount of shake of the image pickup apparatus 10 increases and the ratio of the detection signal exceeding the threshold value "VLth1" increases, the ratio of the detection signal exceeding the threshold value "VRth" increases, as shown in FIG. 8(C).

When the ratio exceeds the threshold value "VRth" at time point t2, the result of the determination as to whether a panning operation or a tilting operation is being performed is "NO", as shown in FIG. 8(B). Since the ratio exceeds the threshold value "VRth" when no panning or tilting operation is being performed, the control unit 50 changes the displacement range of the correction lens unit 113 to that for the blur correction performance priority mode, as shown in FIG. 8(D).

The displacement range for the blur correction performance priority mode is that, as indicated by the broken line in FIG. 3, obtained by removing a certain limit placed on the displacement range. Thus, the range of blur correction is wider than that in the case where the displacement range of the correction lens unit 113 is set to that for the image quality priority mode. Therefore, even if the amount of blur of an optical image formed on the image pickup surface of the image pickup element 21 increases due to, for example, a shake during walking, it is possible to correct the blur of the optical image. Thus, even while walking, the user can perform an image pickup operation in which an image blur is corrected.

At time point t3, for example, the user stops walking and starts performing a panning operation or a tilting operation. Then, when the signal level of the detection signal exceeds the threshold value "VLth2" as shown in FIG. 8(A), the control unit 50 starts measuring the duration. Specifically, when the signal level of the detection signal exceeds the threshold value "VLth2" at time point t4, the control unit 50 starts measuring the duration in which the signal level of the detection signal exceeds the threshold value "VLth2".

When the duration becomes longer than or equal to a predetermined duration at time point t5, the control unit 50 determines that a panning operation or a tilting operation is being performed. Then, as shown in FIG. 8(B), the control unit 50 outputs "YES" as a result of the determination as to whether a panning operation or a tilting operation is being performed. At the same time, the control unit 50 resets the angular velocity data history to zero. When the angular velocity data history is reset to zero, the ratio of the detection signal exceeding the threshold value "VLth1" becomes "0", as shown in FIG. 8(C). Since the ratio becomes lower than or equal to the threshold value "VRth", the control unit 50 changes the displacement range of the correction lens unit 113 to that for the image quality priority mode.

Then, when the panning or tilting operation ends, the signal level of the detection signal becomes, for example, lower than or equal to the threshold value "VLth2" at time point t6, as shown in FIG. 8(A). At this point, the control unit 50 determines that the panning or tilting operation has ended. Then, as shown in FIG. 8(B), the control unit 50 outputs "NO" as a result of the determination as to whether a panning or tilting operation is being performed.

As described above, the determinations as to the amount of shake and whether a panning operation or a tilting operation is being performed are made on the basis of the detection signal. Then, on the basis of the determinations, the displacement range of the correction lens unit 113 is changed. Thus, as described above, it is possible to perform an image pickup operation in which both reduction in image degradation and improvement in blur correction performance can be achieved.

In the example of FIG. 8(A), the signal level of the detection signal is compared to the threshold values "VLth1" and "VLth2". Alternatively, the absolute value of the amount of change from the reference value "VL0" of the detection signal may be calculated and compared to the threshold values "VLth1" and "VLth2". When the absolute value is thus used, the determinations as to the amount of shake and whether a panning operation or a tilting operation is being performed can be made regardless of the direction of movement.

As long as the displacement range is changed to that for the blur correction performance priority mode when the amount of shake is large, the change of the displacement range may not be made on the basis of the ratio of the detection signal exceeding the threshold value "VLth1". For example, the displacement range may be changed to that for the blur correction performance priority mode when the number of times the signal level of the detection signal has exceeded a threshold value per unit time exceeds a predetermined number of times.

(4. Second Operation of Blur Correcting Device)

Figure 9:
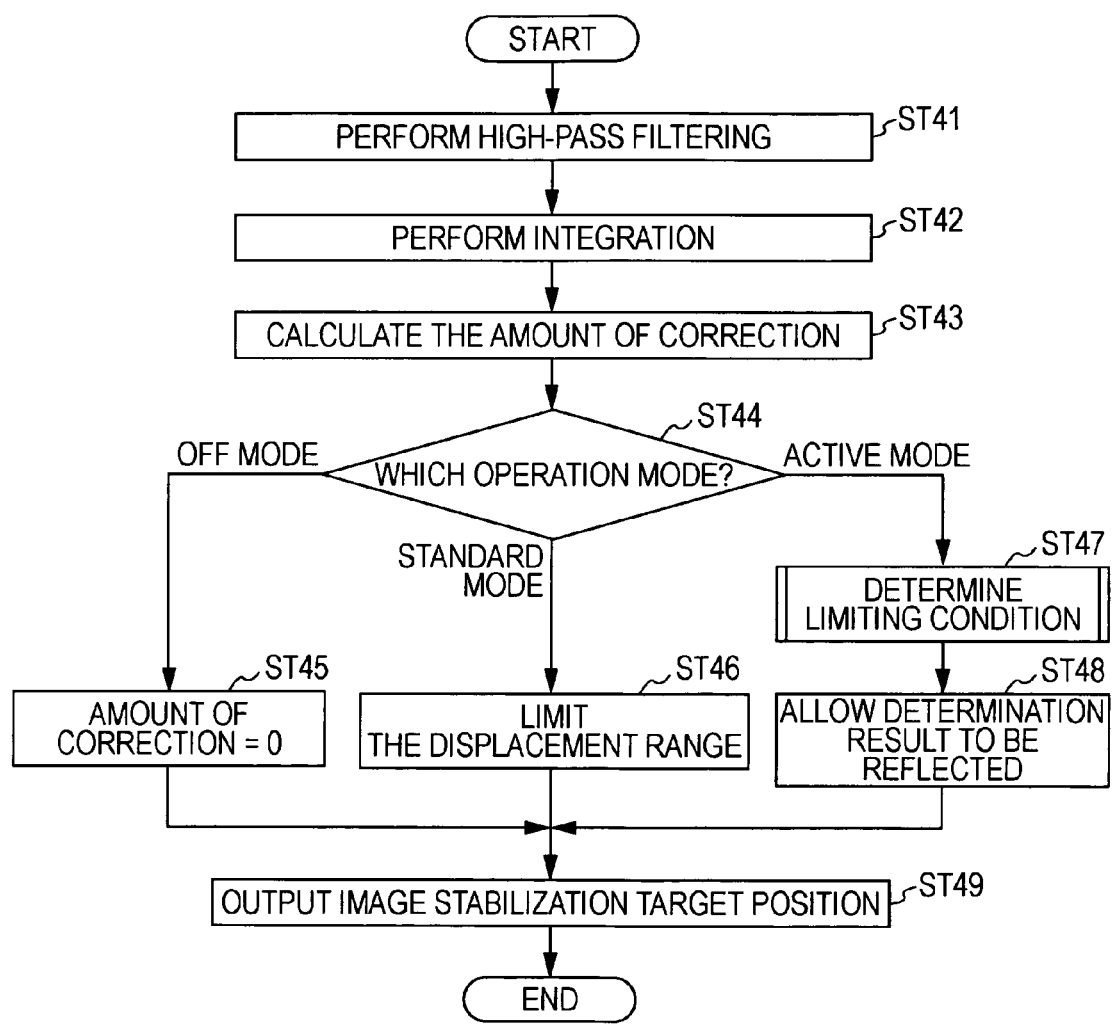
FIG. 9 is a flowchart illustrating a second operation of the blur correcting device.

As a second operation of the blur correcting device, an operation performed when the user can select an operation mode of blur correction will be described. FIG. 9 is a flowchart illustrating a second operation of the blur correcting device. In the second operation, an off mode, a standard mode, and an active mode are provided as operation modes. The off mode is an operation mode in which no blur correction is performed. The standard mode is an operation mode which allows blur correction in which, regardless of the amount of shake, the displacement range of the correction lens unit 113 is limited to a range narrower than the maximum displacement range. The active mode is an operation mode which allows blur correction in which, by changing the displacement range of the correction lens unit 113 in accordance with the amount of shake, both reduction in image degradation and improvement in blur correction performance are achieved.

In step ST41, the control unit 50 performs high-pass filtering on the detection signal. This removes direct-current components from the detection signal. Then, the process proceeds to step ST42.

In step ST42, the control unit 50 performs integration on the detection signal. That is, the control unit 50 performs integration on the shake detection signal to convert an angular velocity to an angle. Then, the process proceeds to step ST43.

In step ST43, the control unit 50 calculates the amount of correction. The control unit 50 determines a focal length on the basis of positional signals supplied from the image pickup optical system sensor 13. Additionally, on the basis of the determined focal length and the angle determined in step ST42, the control unit 50 calculates the amount of correction to be made by the correction lens unit 113. Then, the process proceeds to step ST44.

In step ST44, the control unit 50 determines which mode is set as the operation mode. If the control unit 50 determines that the off mode is set as the operation mode, for example, by a user's operation on the operation unit 41, the process proceeds to step ST45. If the control unit 50 determines that the standard mode is set as the operation mode, the process proceeds to step ST46. If the control unit determines that the active mode is set as the operation mode, the process proceeds to step ST47.

In step ST45, the control unit 50 sets the amount of correction to "0". That is, the control unit 50 consistently sets the amount of correction calculated in step ST43 to "0" so as to prevent blur correction from being performed. Then, the process proceeds to step ST49.

In step ST46, the control unit 50 limits the displacement range. By limiting the displacement range such as that indicated by the solid line in FIG. 3, the control unit 50 performs blur correction in which priority is given to image quality. Therefore, when the amount of correction calculated in step ST43 exceeds the displacement range, the control unit 50 limits the amount of correction to the displacement range. Then, the process proceeds to step ST49.

In step ST47, the control unit 50 determines a limiting condition. Specifically, the control unit 50 determines a limiting condition in a manner similar to that of step ST4 described above, and sets the displacement range of the correction lens unit 113. Then, the process proceeds to step ST48.

In step ST48, the control unit 50 allows the result of the determination made in step ST47 to be reflected. If the amount of correction calculated in step ST43 exceeds the displacement range set in the process of determining a limiting condition in step ST47, the control unit 50 limits the amount of correction to the displacement range set in step ST47. If the amount of correction calculated in step ST43 does not exceed the displacement range set in step ST47, the control unit 50 uses the amount of correction without limiting it.

In step ST49, the control unit 50 outputs an image stabilization target position. Specifically, the control unit 50 defines, as the image stabilization target position of the correction lens in the correction lens unit 113, a position reached by moving by the amount of correction determined step ST45, ST46, or ST48 in a direction in which a blur of an optical image formed on the image pickup surface is to be corrected. Additionally, the control unit 50 generates a lens control signal and outputs the lens control signal to the driver 12, so as to move the correction lens in the correction lens unit 113 to the image stabilization target position. On the basis of the lens control signal supplied from the control unit 50, the driver 12 drives the actuator in the correction lens unit 113 to move the correction lens to the image stabilization target position.

Thus, for example, when performing an image pickup operation using a tripod, the user can stop the blur correcting function by selecting the off mode. When performing an image pickup operation while holding the image pickup apparatus 10 at rest by hand, the user can correct hand shake and give priority to image quality by selecting the standard mode. When performing an image pickup operation in a state where shake greater than hand shake may occur, for example, when performing an image pickup operation while walking or in a moving vehicle, the user may select the active mode. When the active mode is selected, since blur correction in which both reduction in image degradation and improvement in blur correction performance are achieved is performed, it is possible to correct blur which may be difficult to be completely corrected in the standard mode. Thus, even in the case where a picked-up image may blur in the standard mode, a blur-corrected picked-up image can be obtained. To give priority to blur correction performance in the active mode, the displacement range for the active mode is made wider than that for the standard mode. Therefore, when the amount of shake is large, the image quality achieved in the active mode may be lower than that achieved in the standard mode.

(5. Another Operation for Determining Limiting Condition)

In the process of determining a limiting condition illustrated in FIG. 5, the displacement range of the correction lens unit 113 is set to that for either of the blur correction performance priority mode and the image quality priority mode. However, the displacement range may be set more precisely.

Figure 10:
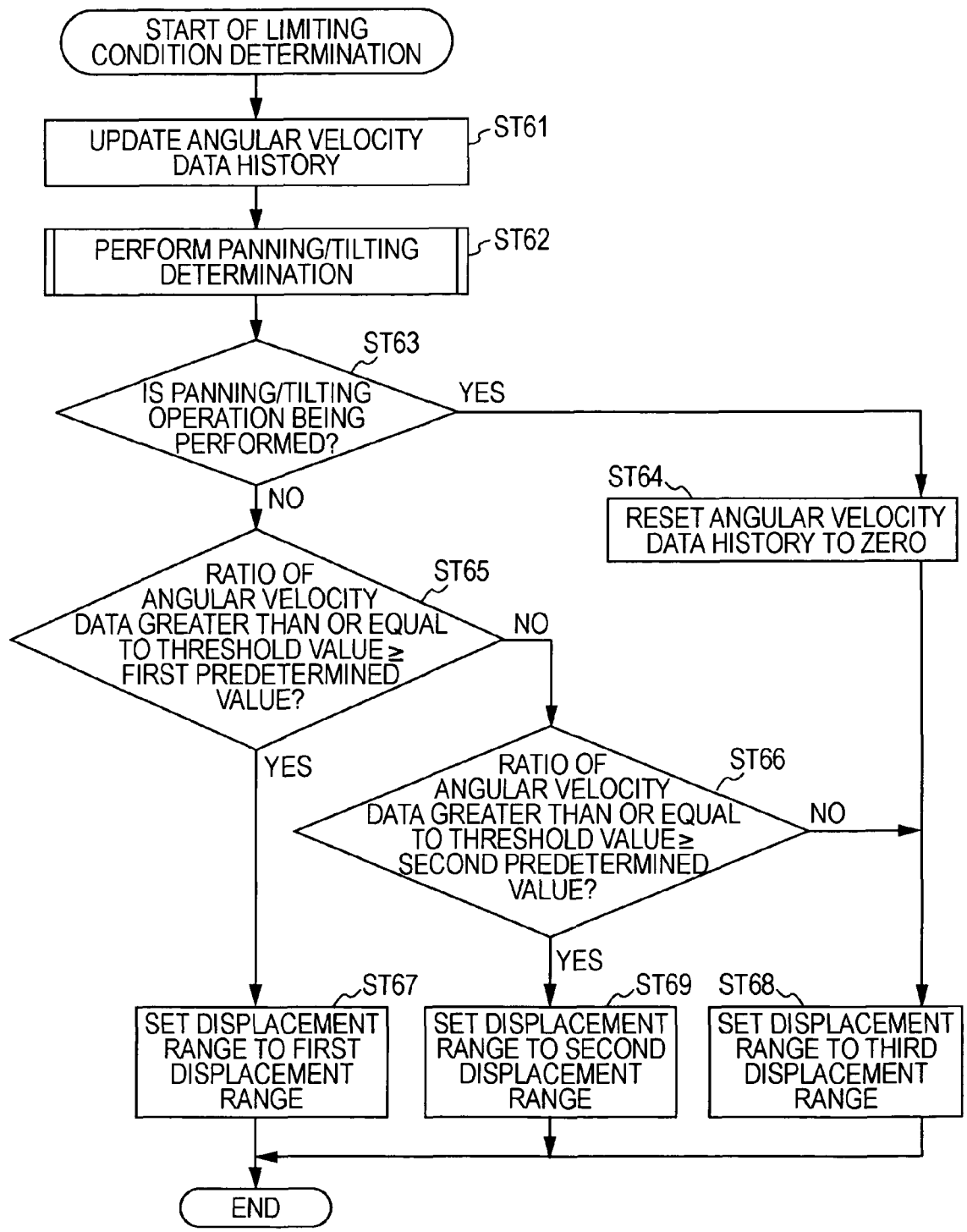
FIG. 10 a flowchart illustrating another operation for determining a limiting condition.

FIG. 10 is a flowchart illustrating another operation for determining a limiting condition. In this operation, the displacement range can be set to three different levels. In step ST61, the control unit 50 updates an angular velocity data history for use in determining a limiting condition. To determine a limiting condition, the control unit 50 stores angular velocity data for a certain period of time as the angular velocity data history. Then, the process proceeds to step ST62.

In step ST62, the control unit 50 performs a panning/tilting determination illustrated in FIG. 6 and obtains a result of the determination. Then, the process proceeds to step ST63.

In step ST63, the control unit 50 determines whether a panning/tilting operation is being performed. If the control unit 50 determines, in the process of panning/tilting determination in step ST62, that a panning operation or a tilting operation is being performed, the process proceeds to step ST64. If the control unit 50 determines, in the process of panning/tilting determination in step ST62, that no panning or tilting operation is being performed, the process proceeds to step ST65.

In step ST64, the control unit 50 resets the angular velocity data history described above to zero. Then, the process proceeds to step ST68.

In step ST65, the control unit 50 determines whether the ratio of angular velocity data greater than or equal to a threshold value is greater than or equal to a first predetermined value. If the control unit 50 determines that the ratio of angular velocity data greater than or equal to the threshold value is greater than or equal to the first predetermined value, the process proceeds to step ST67. If the control unit 50 determines that the ratio of angular velocity data greater than or equal to the threshold value is less than the first predetermined value, the process proceeds to step ST66.

In step ST66, the control unit 50 determines whether the ratio of angular velocity data greater than or equal to the threshold value is greater than or equal to a second predetermined value smaller than the first predetermined value. If the control unit 50 determines that the ratio of angular velocity data greater than or equal to the threshold value is greater than or equal to the second predetermined value, the process proceeds to step ST69. If the control unit 50 determines that the ratio of angular velocity data greater than or equal to the threshold value is less than the second predetermined value, the process proceeds to step ST68.

In step ST67, the control unit 50 sets the displacement range of the correction lens unit 113 to a first displacement range. The first displacement range is wider than a second displacement range and a third displacement range described below. For example, as indicated by the broken line in FIG. 3, a range obtained by removing a certain limit placed on the displacement range is defined as the first displacement range.

The case where the process proceeds from step ST63 via step ST65 to step ST67 is the case where the amount of shake is large. Therefore, to perform an operation in which priority is given to blur correction performance, the control unit 50 sets the displacement range of the correction lens unit 113 to the first displacement range.

In step ST68, the control unit 50 sets the displacement range of the correction lens unit 113 to the third displacement range. The third displacement range is narrower than the second displacement range described below. For example, as indicated by the solid line in FIG. 3, a range obtained by placing a certain limit on the displacement range is defined as the third displacement range.

The case where the process proceeds from step ST63 via step ST65 and step ST66 to step ST68 is the case where the amount of shake is small. The case where the process proceeds from step ST63 via step ST64 to step ST68 is the case where a panning/tilting operation is being performed. Therefore, to prevent the situation where a subject does not move smoothly in response to a panning operation and a tilting operation, and to perform an operation in which priority is given to image quality, the control unit 50 sets the displacement range of the correction lens unit 113 to the third displacement range.

In step ST69, the control unit 50 sets the displacement range of the correction lens unit 113 to the second displacement range. As described above, the second displacement range is narrower than the first displacement range and wider than the third displacement range. The case where the process proceeds from step ST63 via step ST65 and step ST66 to step ST69 is the case where the amount of shake is smaller than that in the case where the displacement range is set to the first displacement range and larger than that in the case where the displacement range is set to the third displacement range. Therefore, to perform an operation in which priority higher than that in the case where the displacement range is set to the first displacement range is given to image quality and priority higher than that in the case where the displacement range is set to the third displacement range is given to blur correction performance, the control unit 50 sets the displacement range of the correction lens unit 113 to the second displacement range.

With the processing described above, it is possible to change the displacement range of the correction lens unit 113 in accordance with the amount of shake, from the range in which the highest priority is given to image quality, the range being narrower than the maximum displacement range, to the maximum displacement range in which the highest priority is given to blur correction performance.

The present invention should not be interpreted as being limited to the embodiments described above. For example, the configuration is not limited to that described above, as long as a blur of an optical image on the image pickup surface caused by a shake detected by the shake detecting unit is corrected by displacing the relative positional relationship between the correction lens unit and the image pickup element in accordance with a filtered shake detection signal. Also, the shake detecting unit is not limited to that including an angular velocity sensor or an acceleration sensor described above, as long as the shake detecting unit is capable of detecting a shake of the image pickup apparatus. For example, the shake detecting unit may detect a shake of the image pickup apparatus from a picked-up image. Also, as long as the amount of shake is determined on the basis of the detection signal from the shake detecting unit and the displacement range of the correction lens unit is set on the basis of the result of the determination, the amount of shake does not necessarily have to be determined on the basis of the ratio of the detection signal having a signal level exceeding a threshold value.

The blur correcting device may either be provided in the removable lens or in the main body of the image pickup apparatus. Alternatively, only part of the blur correcting device, such as only the correction lens unit and the drive unit that drives the correction lens unit, may be provided in the removable lens, and the other components of the blur correcting device may be provided in the main body of the image pickup apparatus. Also, instead of the correction lens unit, the image pickup element may be displaced on the basis of the detection signal from the shake detecting unit, in the direction in which a blur of an optical image formed on the image pickup surface of the image pickup element is to be corrected.

The above-described embodiments disclose the present invention in the form of examples. It will be obvious that modifications and alternations may be made thereto by those skilled in the art without departing from the scope of the present invention. Accordingly, the appended claims should be referenced to determine the scope of the present invention.

What is claimed is:

1. A blur correcting device comprising:
   a shake detecting unit configured to detect a shake and output a detection signal indicating a result of the detection;
   a drive unit configured to displace a relative positional relationship between a lens unit and an image pickup element relative to an optical axis such that a position of an optical image formed on an image pickup surface of the image pickup element is displaced on the image pickup surface; and
   a control unit configured to control the drive unit to displace the relative positional relationship between the lens unit and the image pickup element within a displacement range in accordance with the detection signal, and thereby correct a blur of the optical image on the image pickup surface caused by the shake detected by the shake detecting unit,
   wherein, the control unit is configured to limit said displacement range to a first range narrower than a maximum displacement range in accordance with a zoom position,
   the control unit is configured to limit said displacement range to said first range when the amount of shake indicated by the detection signal is smaller than a predetermined level, and
   the control unit is configured to limit said displacement range to a second range when the amount of shake indicated by the detection signal is larger than said predetermined level, wherein said second range is increased relative to said first range.

2. The blur correcting device according to claim 1, wherein in accordance with the amount of shake indicated by the detection signal, the control unit is configured to change the displacement range from said first range to said maximum displacement range.

3. The blur correcting device according to claim 1, wherein the control unit is configured to determine, on the basis of the detection signal, whether a panning operation or a tilting operation is being performed, and is configured to limit said displacement range to said first range when panning or tilting operation is being performed,
   the control unit being configured to limit said displacement range to said second range when the amount of shake indicated by the detection signal is larger than said predetermined level and when no panning or tilting operation is being performed.

4. The blur correcting device according to claim 1, wherein the control unit is configured to detect that the shake detected by the shake detecting unit is larger than the predetermined level when a ratio of a signal level of the detection signal indicating the amount of shake exceeds a threshold value (VRth).

5. The blur correcting device according to claim 1, further comprising an operation unit to enable a user to supply an input to the control unit so as to control a desired operation thereat, and wherein by use of the operation unit the user can select any of an operation mode in which correction of a blur of the optical image is not performed, an operation mode in which the displacement range of the lens unit or the image pickup element is limited to said second range to perform correction of a blur of the optical image when the shake detected by the shake detecting unit is larger than the predetermined level, and an operation mode in which the displacement range is fixed to perform correction of a blur of the optical image regardless of the shake detected by the shake detecting unit.

6. The blur correcting device according to claim 1, in which the blur correcting device is arranged within an image pickup apparatus having a signal processing unit configured to perform camera signal processing using an image signal generated by the image pickup element.

7. The blur correcting device according to claim 1, wherein in accordance with the amount of shake indicated by the detection signal, the control unit is configured to change the displacement range such that the displacement range when the zoom position is at a tele end is the same as that when the zoom position is at a wide end.

* * * * *